United States Patent Office 3,509,245
Patented Apr. 28, 1970

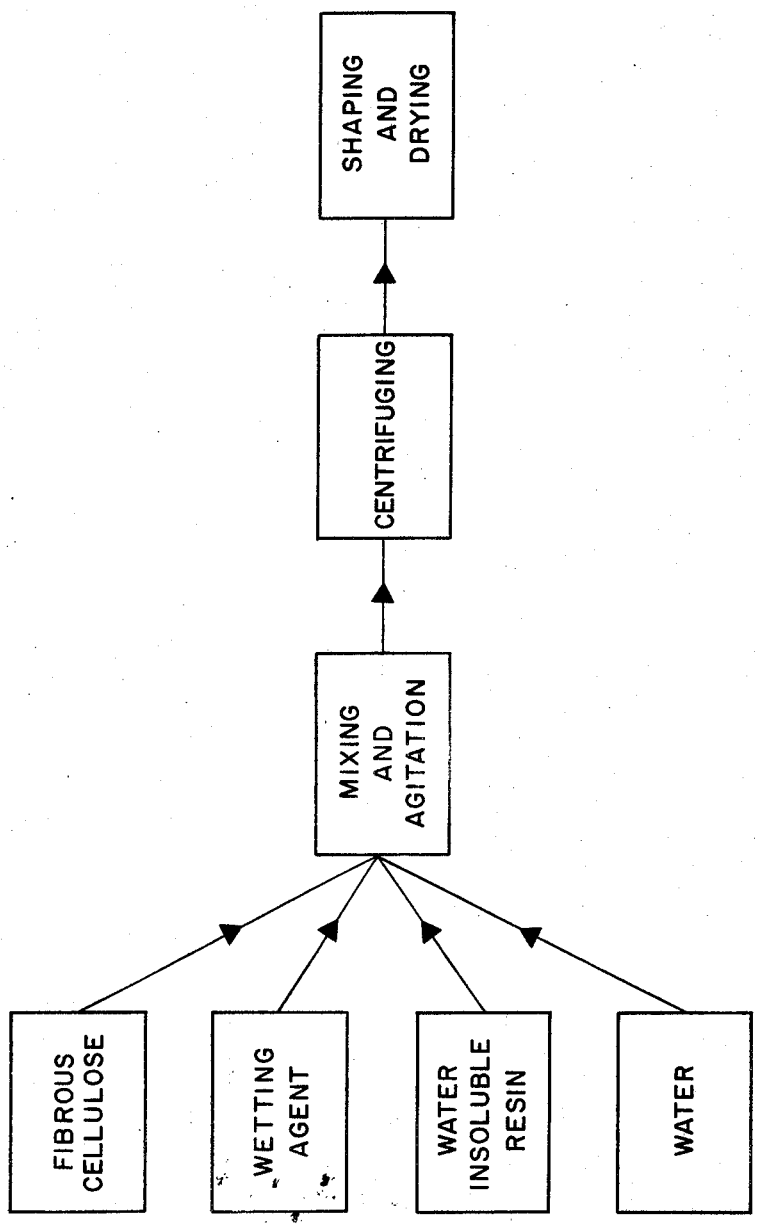

3,509,245
PRODUCTION OF FOAMED CELLULOSE
Joseph Santangelo, Morristown, N.J., and John A. McTaggart, New York, N.Y., assignors to Celanese Corporation, New York, N.Y., a corporation of Delaware
Filed Sept. 9, 1966, Ser. No. 578,142
Int. Cl. B29d 23/04, 27/06
U.S. Cl. 264—50                                6 Claims

ABSTRACT OF THE DISCLOSURE

A process for preparing non-collapsed foam cellulose structures is provided whereby a mixture of fibrous cellulose, wetting agent, a water-insoluble resin having a glass transition temperature of at most 50° C. and water, the cellulose comprising at least 0.7% by weight of the mixture, is centrifuged under conditions such that 50–95% of the total water in the mixture is removed in a time no shorter than 10 seconds.

---

This invention relates to the improved production of foamed cellulose structures.

Man has constantly searched for new ways to convert readily accessible raw materials easily and cheaply into an ever increasing variety of products. One of the most readily available raw materials is vegetable fibers, such as wood and cotton. Researchers in the late 1920's found that upon agitating a mixture of fibrous cellulose and a wetting agent, a relatively stable foam could be formed. They further found additives to water-proof, fire-proof and increase the rigidity of the foam. Other improved cellulose foams are described in commonly assigned applications Ser. No. 444,104, filed Mar. 29, 1965, and now abandoned, and Ser. No. 543,083, filed Apr. 18, 1966.

These foams may be used as heat insulators, sound absorbents, packing materials, cushioning and padding substances, household sponges, synthetic leather, nonwoven fabrics, textile insulative materials, diapers, sanitary napkins, structural insulation, toys, catalytic surfaces, industrial filters, cigarette filters and the like.

However significant production difficulties have limited commercial exploitation of these cheap materials, particularly the long processing time, large floor space, and high power requirements necessary to drain and dry the foam. Naturally the prime advantage of the low raw material cost of these foamed structures is somewhat vitiated by high production costs. It is an object of this invention to reduce the production costs of these foams. More particularly it is an object to reduce the time, floor space and power required for production of these foamed structures.

Previous workers indicated that the use of suction or vacuum to remove the water at least partially collapses the foam. It is a specific object of this invention to reduce the cost and time for production of these cellulose foams without destroying the open celled and uncollapsed state of the foam.

These objects have now been met by the process which involves partially draining the water in the wet foam by controlled centrifugation. It was surprising to find that such a foam could be centrifuged without collapse. Broadly the process comprises forming a slurry comprising fibrous cellulose, wetting agent, and suitable water-insoluble resin and water and expanding the slurry to a foam by agitation. The foam is then centrifuged according to the method of this invention, shaped and dried. It is critical that the initial centrifugal force applied be low and its rate of increase gradual.

The rate of increase of centrifugal force should be such that from 50 to 95% of the total water in the foam slurry is removed in a time not shorter than 10 seconds. It is also critical that the cellulose constitute at least 0.7% by weight of the total foam slurry.

For most end products, the nature of the fibrous cellulose starting material is not critical. Wood pulps of moderate alpha cellulose content represent a convenient source. For special applications, for example cigarette filters where flavor is an important factor, refined wood pulps having a high alpha cellulose content are preferred. However except where such special considerations are involved, it is sufficient to employ cheap and readily available fibrous sources. Cotton linters represent another good source. The fiber length is advantageously less than ½ inch, and desirably less than ¼ inch. Longer fibers are more difficult to disperse but may be present in smaller amounts (e.g. about 1 to 10%) to add strength.

The relative proportions of fibrous cellulose and water should be such as to produce a tractable slurry. Generally this calls for a weight ratio of water to cellulose of at least 10:1. However it is critical that the cellulose constitute at least 0.7% by weight of the total foam slurry.

The amount of fibrous cellulose that should be present in the dried foamed product can be varied over a wide range, depending upon the properties and uses desired. Generally the fibrous material should constitute from about 30 to 90%, preferably 50 to 85%, by weight based on the weight of the dried foamed product.

For most end uses, the nature of the wetting agent is not critical except that it should be compatible with the other ingredients used and one which has the property of forming relatively stable bubbles or foam in their presence. Exemplary of such wetting agents are sodium lauryl sulfate, particularly a grade containing some free lauryl alcohol (Orvus), the glucoside saponin, salts (particularly sodium salts) of long chain sulfonic acids such as long chain alkylbenzene sulfonic acids, long chain alkanolamides such as lauric mono- or di-ethanolamide, alkylphenol-ethylene oxide condensation products, and long chain quaternary ammonium compounds such as hexadecyltrimethyl-ammonium bromide. The proportion of foaming agent is advantageously in the range of about 0.2 to 1% based on the weight of water in the slurry except when free wetting agent is desired to be incorporated into the product as described for example in the aforesaid application Ser. No. 543,083.

The water-insoluble resin should have the ability to form a continuous film at relatively low temperatures upon the evaporation of the water. Although resins having a glass transistion temperature ($T_g$) of as high as 50° C. are utilizable, it is preferred, and particularly for such end uses as sponges, that the $T_g$ be 20° C. or less. Tables of glass $T_g$ factors are readily available so that the $T_g$ of copolymers based on the percent constituent monomers can readily be ascertained by adding the temperature factors of each constituent corresponding to its percentage in the copolymer. For example the $T_g$ of a copolymer consisting of 55% methyl methacrylate, 40% ethyl acrylate and 5% butyl methacrylate can be calculated from the tables of Rohm & Haas Acrylic Glass Temperature Analyzer by adding together the corresponding temperature factors, 1.46, 1.59 & 0.17 respectively, to yield a net temperature factor of 3.22 which corresponds to a $T_g$ of 38° C. The minimum film-forming temperature (M.F.T.) is slightly lower than the glass transition temperature due to the presence of impurities. Thus the glass transition temperature represents a readily ascertainable theoretical limit for determining whether a polymer or copolymer is within the scope of the invention.

The resin can optionally be curable, i.e., cross-linkable either by thermal or chemical treatment, or not, depending largely on the intended end use. For example in preparing leather-like products and sponges, the use of a curable resin is essential, while in preparing cigarette filters the property of curability is not necessary.

Homopolymers or copolymers can be employed. Exemplary of suitable resins are polyvinylacetate, polyvinylidene chloride, polybutyl acrylate and cross-linkable acrylics. Homopolymers of vinyl-chloride, styrene and acrylonitrile are not suitable resins for this invention, however copolymers in which these monomers are included and which have a suitably low glass transition temperature are utilizable. Numerous commercial formulations are available. For example, the polyvinyl acetate homopolymer emulsion used in the examples CL-101, was prepared by the polymerization of vinyl acetate monomer using a hydrogen peroxide catalyst solution and a Hydrozin (zinc formaldehyde sulfoxylate) activator solution and an Elvanol (polyvinyl alcohol) colloid solution. The number of possible resinous emulsion formulations utilizable in the instant invention is almost limitless and many combinations will be apparent to one skilled in the art. The film-forming, water-insoluble resin should be added as a dispersion, preferably an aqueous dispersion, in an amount such as to be present in the final dried product in a minor concentration generally less than 50%, e.g. within the range of about 5% to 45%, based on the weight of the dried foam. Employing the method of this invention, it is necessary to supply more resin to the slurry than will appear in the final product since some of the resin appears in the liquid centrifuged from the foam. About twice as much resin should be added as desired in the final product, depending of course on the centrifugation conditions.

In certain end uses wherein good dimensional stability under sustained adverse conditions and other such characteristics are desired, certain water-thickening materials can be included in the slurry to be foamed as described in application Ser. No. 543,083.

Suitable polyelectrolyte water-thickening materials include the water soluble salts of carboxymethylcellulose, e.g. sodium, ammonium, calcium, and potassium carboxymethylcellulose, sodium alginate and other water-soluble alginates, poly (sodium acrylate), poly (ammonium acrylate) and copolymers containing these acrylic monomers. When employed, the poly-electrolyte water-thickening materials should be present in the foamed structure in an amount by weight of about from 0.2% to 5%, preferably 1% to 3%, based on the weight of dry foamed product. Non-electrolytic thickening materials such as starch can be employed but they are not preferred, particularly for flexible structures. They generally requires significantly higher concentrations to be as effective as the polyelectrolytic thickeners.

The heart of this invention is of course the controlling of the centrifugation step such that the bulk of the water may be removed without foam collapse. It is critical that the initial centrifugal force be low and its rate of increase be gradual. The rate of increase of centrifugal force should be such that from 50 to 95% of the total water in the foam slurry is removed in a time not shorter than 10 seconds. It is also critical that the cellulose constitute at least 0.7% by weight of the total foam slurry. 50-90% of the water should be removed in about 10-60 seconds although maintenance of the same centrifugal force after this time will not collapse the foam. By observing these parameters a semi-dry foam can be produced without any foam collapse.

Within these parameters the optimum rate of increase of centrifugal force depends largely upon the nature of the foam and by simple experimentation one can determine the optimum values for any given foam input.

This process can be batch-wise or continuous. A convenient apparatus for the batch-wise process is the basket centrifuge. In this embodiment the expanded foam is placed in the basket and the centrifuge placed into operation. The speed is regulated such that the centrifugal force is gradual.

The centrifugal force, $Fc/m$ (in units of force lbs./lb. mass), can be readily determined by the formula $$Fc/m = 2.84 \times 10^{-5} N^2 r$$

wherein $N$ is the speed in revolutions per minute (r.p.m.) and $r$ is the radius of the basket in inches.

When the desired amount of water is removed, the motor is stopped and the semi-dried non-collapsed foam is removed.

The process can be made continuous by employing for example a continuous underdriven centrifuge having a conical rotor enveloped by an attached perforated conical sheet. The agitated foam is pumped in at the apex through the conical space between the perforated sheet and rotor while the rotor and attached sheet are rotated at fixed speed. The foam is subject to increasingly high centrifugal force as it is pushed down the cone to the base. The rate of pumping and the speed of the rotor are chosen so that in conjunction with the geometry of the cone the optimum rate of increase of centrifugal force for a given wet foam product is achieved.

The centrifuged foam can then be further processed in a variety of ways and can conveniently be transported with a screw or a piston pump by applying centrifugal force. Four preferred processing paths are:

(1) Feeding to a double belt drying system (top and bottom belts) to produce a sheet of celluose foam which dries in a much shorter period of time than noncentrifuged foam.

(2) Feeding to a single belt system (bottom belt only) to produce a sheet which upon drying without the top support does not collapse.

(3) Extruding through a cylindrical tube to form cylindrical non-collapsing rods which retain their structure when dried. These rods can then be converted for example into the cigarette filter tips as described in application Ser. No. 444,104.

(4) Shredding or pelletizing prior to drying to provide material which will dry in the shortest period of time of any of the above geometries and systems. This shredded material may then be fed to a rod maker such as is used in feeding tobacco to make cigarettes for the production of cigarette filter rods. An additional advantage of this system is the ability to combine the output of many slow speed drying lines to feed a single high speed rod maker.

A relatively wet centrifuged product is desired when the foam is to be extruded, a relatively drier product when the foam is to be processed into sheet and an even drier product is called for when the foam is to be pelletized.

By extruding the cellulose foam in accordance with the method of this invention it is possible to prepare filter rods while entirely eliminating the tube containers necessary to hold the foam material during drying and drainage as in the process described in the aforesaid application Ser. No. 444,104.

Example I illustrates the preparation of foamed cellulose according to the method of this invention and its extrusion to form a cylindrical rod. Attached drawing is a diagrammatic illustration process of the present invention.

EXAMPLE I

A foam was prepared by conventional agitation of a slurry of the following composition:

Cellulose (wood pulp)—4 gm.
Water—250 gm.
C1-101 (55% solids) (Polyvinyl acetate homopolymer disucssed above)—60 cc.
Orvus (10% solids)—30 cc.

The foam was placed in a basket centrifuge at rest having an 11 inch diameter. The speed of the centrifuge was gradually increased to 3000 r.p.m. over the course of 1 minute and then maintained at that speed for an additional minute. 90% of the water was removed. The resulting structure was uncollapsed, rigid and semidry. This structure was removed from the centrifuge and placed in an extrusion device comprising a cylindrical chamber to which a pipe of 1 centimeter in diameter, 1 inch long, is attached. The foam was forced through this pipe by means of a plunger applied by hand from the opposite end of the cylinder. The material appeared viscoelastic in nature during the extrusion. The resulted material deposited on a Teflon (or other non-sticking surface) retained its extruded form and shape. This material was then placed for 3 minutes in a 120° oven, having a 40 feet per second air sweep, and dried without any foam collapse.

Example II illustrates the point that unless critical minimum cellulose concentrations are observed, the foam will collapse. The foams were prepared in the same manner as in Example I except that the amount of cellulose used is as indicated. The same basket centrifuge as used in Example I was employed.

EXAMPLE II (a) 453 grams of this foam containing 2 grams of cellulose were centrifuged gradually up to a speed of 1100 r.p.m. in 20 seconds. 364 milliliters of 80% of the total water present was removed and the resultant foam had a low height indicating partial foam collapse. When subsequently dried in an air oven at 120° C. the material completely collapsed.

(b) Similarly 450 grams of the same foam as in part (a) were centrifuged gradually up to a speed of 500 r.p.m. in 60 seconds. 414 milliliters or 92 % of the total water present was removed and the resultant foam had low height. When subsequently dried in an air oven at 120° C. the material completely collapsed.

(c) 449 grams of this foam containing 4 grams of cellulose was centrifuged gradually up to a speed of 400 r.p.m. in 15 seconds. 262 milliliters or 58% of the total water present was removed. The foam did not collapse.

(d) 453 grams of this same foam containing 4 grams of cellulose was centrifuged gradually up to a speed of 500 r.p.m. in 20 seconds. 75% of the water was removed and the foam did not collapse.

After centrifuging, the foams of parts (c) and (d) along with the adhering cheese cloth lining were removed from the basket. This cheese cloth was turned upside down and suspended in the air at room temperature. As a result the foams did not collapse while drying overnight. The thickness did not significantly change on drying.

Example III illustrates the embodiment of this invention wherein even more rapid drying of the centrifuged cellulose foam can be obtained by subdividing the foam structure into small volumes, e.g. spheres, pellets and boxes. These subdivided particles may be recombined when dry to form the feed material to a cigarette filter rod making machine.

EXAMPLE III

A foam was prepared by conventional agitation of a slurry of the following composition:

Wood pulp—4 gm.
Water—215 cc.
Cl–101 (20% solids)—15 cc.
Orvus (10% solids)—20 cc.

The foam was centrifuged in the same apparatus as used in Example I gradually up to a speed of 1350 r.p.m. in 30 seconds. Small balls of the material were intentionally formed. Two piles of these balls about 2 inches square and 1½ inches high on a sponge were placed in separate ovens, one at 35° C. and the other at 75° C. They dried in 15 minutes which is about half the time needed to dry the material on a belt. The structure of the small volumes of cellulose was retained.

Examples IV and V illustrate the embodiment of this invention wherein the centrifuged foam is fed to a belt system for shaping into sheets and drying and then preparing cigarette filters therefrom by cutting and rolling in the conventional manner.

EXAMPLE IV

Foam was prepared from slurries of the following compositions:

Wood pulp—2 grams
Cl–101 (20% solids)—60 grams
Water—215 cc.
Orvus (10% solids)—20 cc.

The foam was centrifuged in the same centrifuge employed in Example I gradually up to a speed of 775 r.p.m. in 15 seconds. 75% of the liquid was removed. The foam was shaped into sheets of ½ inch height, 12 inch width, 6 foot length and dried in an oven at 120° C. for 15 minutes. Cigarette filter tips of 20 mm. length were prepared from the dried foam sheets by cutting into ½ inch square rods, and running the rods through a cigarette rod maker. The tips averaged a pressure drop of 31 mm. water and a weight of .09 gram.

EXAMPLE V

Similar to the above example a foam was prepared from a slurry of the following composition:

Wood pulp—4 grams
Cl–101 (20% solids)—60 grams
Water—215 cc.
Orvus (10% solids)—20 cc.

This foam was centrifuged gradually up to a speed of 775 r.p.m. in 15 seconds. 75% of the liquid was removed. The foam was similarly cut into sheets and dried in an oven at 120° C. for 20 minutes. Cigarette filter tips of 20 mm. length were prepared from the dried foam in the same manner as in the preceding example. They averaged a pressure drop of 40 mm. water and a weight of .09 gram.

Placing of the above foam in the centrifuge while rotating at 500 r.p.m. removes more than 50% of the water in ten seconds and the foam collapses.

Numerous other variants of the above-described process will be apparent to one skilled in the art within the scope of the present invention.

What is claimed is:

1. A process for producing a non-collapsed foamed cellulose structure comprising (a) agitating a mixture comprising fibrous cellulose, a wetting agent, a water-insoluble resin having a glass transition temperature of at most 50° C. and water, wherein said cellulose comprises at least 0.7% by weight of the water and (b) centrifuging said mixture under conditions such that from 50 to 95% of the total water in the mixture is removed in a time not shorter than ten seconds.

2. The process of claim 1 wherein said non-collapsed foamed cellulose structure is subsequently shaped and dried.

3. The process of claim 1 wherein the said ratio of water to cellulose is at least 10:1.

4. The process of claim 1 wherein 50–90% of the water is removed in about 10–60 seconds.

5. The process of claim 1 wherein said water insoluble resin is a polyvinyl acetate homopolymer.

6. The process of claim 1 wherein said non-collapsed foamed cellulose is subsequently shaped by extrusion in a cylindrical tube to form a cylindrical rod.

References Cited

UNITED STATES PATENTS 1,770,409   7/1930   Kehoe _____ 34—8

(Other references on following page)

UNITED STATES PATENTS

| | | | |
|---|---|---|---|
| 2,094,579 | 10/1937 | Bradshaw et al. | 34—8 |
| 2,243,000 | 5/1941 | Brown | 34—8 XR |
| 2,765,515 | 10/1956 | Knudson | 131—267 XR |
| 3,060,139 | 10/1962 | Greminger et al. | |
| 3,080,333 | 3/1963 | Kray et al. | 260—17.4 XR |
| 3,311,115 | 3/1967 | Mueller et al. | 131—269 XR |
| 3,338,994 | 8/1967 | Heron | 264—41 |

FOREIGN PATENTS

| | | |
|---|---|---|
| 362,727 | 12/1931 | Great Britain. |
| 625,521 | 6/1949 | Great Britain. |
| 656,210 | 8/1951 | Great Britain. |
| 1,091,261 | 10/1960 | Germany. |

PHILIP E. ANDERSON, Primary Examiner

U.S. Cl. X.R.

34—8; 131—266, 269; 264—177